Jan. 17, 1950  W. H. DUVALL ET AL  2,494,799
TRAILER COUPLING
Filed Sept. 16, 1946  2 Sheets-Sheet 1

Inventors
William H. Duvall
Alfred L. Barnard
By
E. V. Hardway
Attorney

Jan. 17, 1950   W. H. DUVALL ET AL   2,494,799
TRAILER COUPLING
Filed Sept. 16, 1946                 2 Sheets-Sheet 2
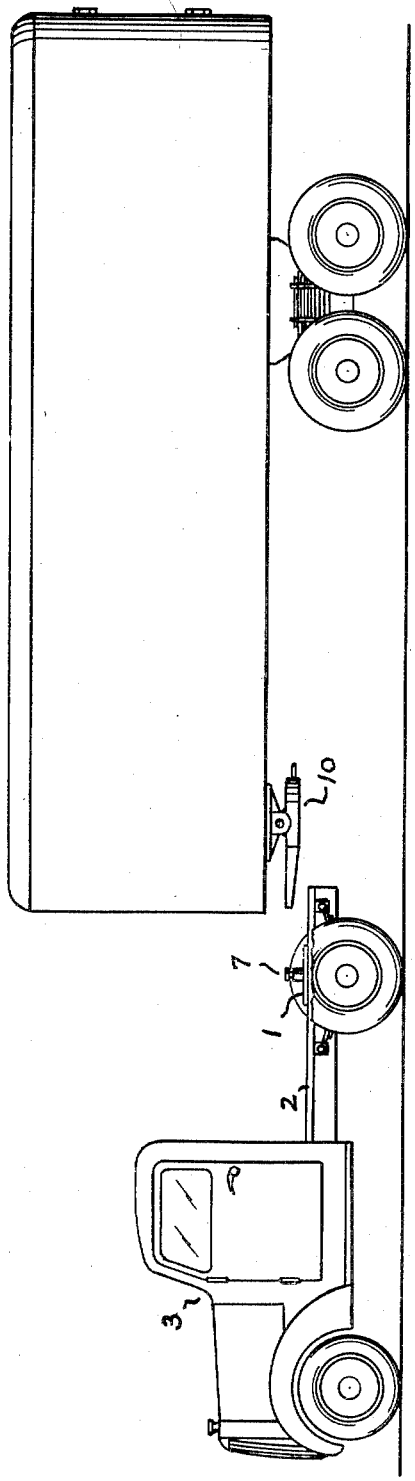
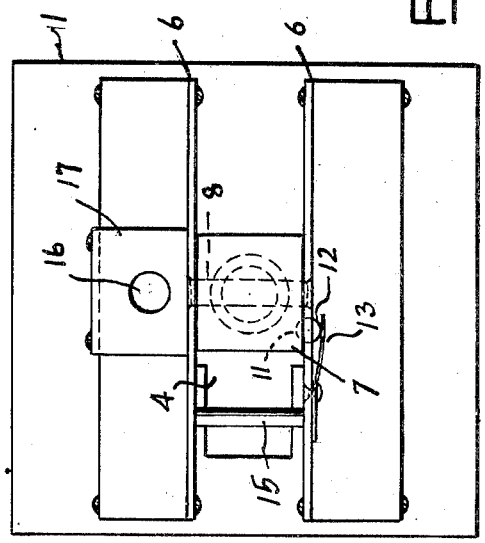
Inventors
William H. Duvall
Alfred L. Barnard
By E. V. Hardway
   Attorney Patented Jan. 17, 1950

2,494,799

UNITED STATES PATENT OFFICE 2,494,799

TRAILER COUPLING

William H. Duvall, Houston, and Alfred L. Barnard, Ganado, Tex.

Application September 16, 1946, Serial No. 697,190

2 Claims. (Cl. 280—33.05)

This invention relates to a trailer coupling.

It is an object of the present invention to provide novel means for connecting a trailer to a tractor.

More specifically the invention resides, in part, in a king pin mounted in a novel manner on the tractor body and to which the fifth wheel of the trailer may be connected.

The king pin is so mounted that, when not in use, it may be retracted beneath the floor of the tractor so as not to interfere with the loading of the tractor when it is not being used as a draft vehicle but as used as a load carrying vehicle.

It is further object of the present invention to provide a construction of the character described which is mounted on the tractor and which is specially constructed for supporting a bolster on the tractor.

With the above and other objects in view the invention has particular relation to certain novel features of construction, arrangement of parts, and use, an example of which is given in this specification and illustrated in the accompanying drawings wherein:

Figure 6 is a bottom plan view and,

Figure 7 is a side view of the tractor and the trailer showing the king pin in active, or upright, position and showing the fifth wheel of the trailer.

Figure 1:
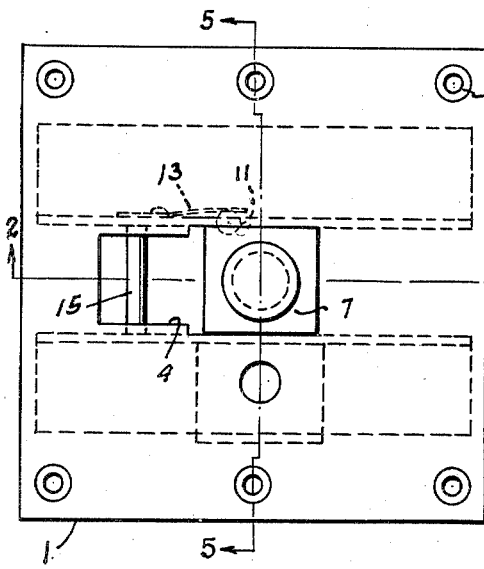
Figure 1 is a plan view of the king pin mounting plate showing the king pin mounted therein and in upright position.
Figure 3:
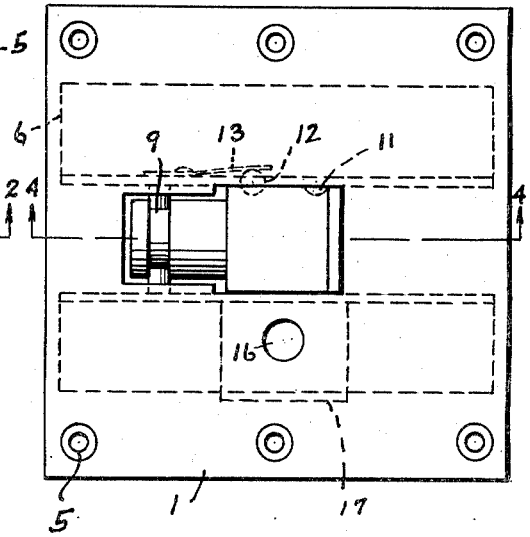
Figure 3 is a plan view thereof showing the king pin retracted.

Referring now more particularly to the drawings, wherein like numerals of reference designate the same parts in each of the figures, the numeral 1 designates the mounting plate for the king pin. This plate may be rectangular in form and is mounted on the floor, or frame, 2 of the tractor 3.

The plate 1 is provided with a T-slot 4.

The plate 1 may be secured to the tractor in any preferred manner as by bolts, the bolt holes 5 being provided in the plate for that purpose.

On opposite sides of the slot 4 and extending transversely of, and secured to, the underside of the plate 1, are the angle irons 6, 6.

The horizontal flanges of these angle irons are secured to the underside of the plate in any preferred manner and the vertical flanges depend on opposite sides of slot 4.

The large end of the slot 4 is centered relative to the longitudinal axis of the tractor.

The numeral 7 designates the king pin whose lower end is approximately square in horizontal cross-section and is fitted through the large end of the T-slot. It is pivoted on a pin 8 whose ends are anchored to the front and rear depending flanges of the angle irons 6, as shown in Figure 6.

The opposite end of the king pin is cylindrical and is provided with an annular groove 9 to receive the clamp jaws of the fifth wheel 10 which is secured to and depends from the forward end of the trailer.

Figure 2:
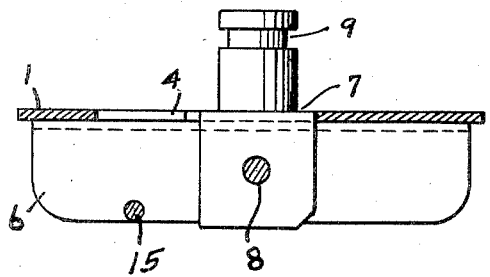
Figure 2 is a cross-sectional view thereof, taken on the line 2—2 of Figure 1.

When the king pin is to be used as a means for connecting the fifth wheel of the trailer to the tractor it is swung into vertical position, as best shown in Figure 2. The base of the king pin has a side recess 11 and there is a ball 12 retained against said side of the king pin by means of a flat pressure spring 13. The recess 11 is positioned so that when the king pin is swung to vertical position the ball will seat in said recess 11 to maintain said king pin vertical.

At times the tractor may be used as an ordinary load carrying vehicle and in such case it is desirable that the king pin be retracted beneath the upper surface of the tractor body and out of the way. In such case the king pin may be swung laterally and downwardly through the slot 4. It is limited in such downward movement by means of a cross pin 15 whose ends are anchored to the depending flanges of the angle irons 6 and which seats in the groove 9. In this position it will not interfere with the load on the tractor 3 and will not be liable to be injured by said load.

Figure 5:
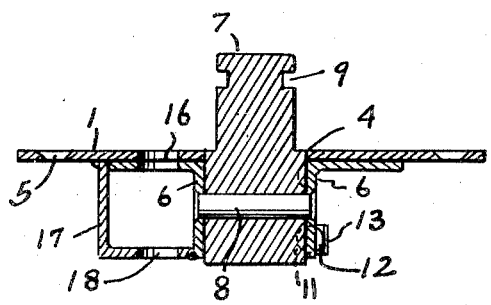
Figure 5 is a cross-sectional view taken of the line 5—5 of Figure 1.

Also at times it may be desirable to install a bolster on the tractor for the connection of a reach pole whose rear end may be connected to the bolster of a trailer. This may be desirable when long loads such as pipe are to be hauled. For that purpose a vertical bearing, as 16, is provided through the plate 1 and through the horizontal flange of one of the angle irons 6 to receive the king pin of a bolster. This bearing is in alignment with the pin 8. There is also an angular bracket 17 whose margins are welded, one to the lower margin of the corresponding angle iron 6 and whose other margin is welded to the underside of the plate 1, as shown in Figure 5, and the horizontal flange of this bracket also has a lower bearing 18 aligned with the bearing 16 to receive said bolster king pin.

Figure 4:
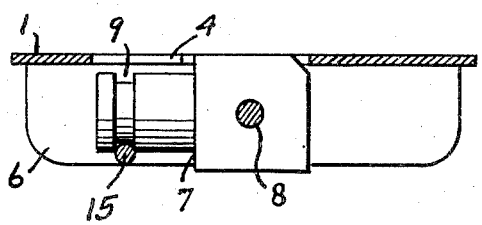
Figure 4 is a cross-sectional view taken of the line 4—4 of Figure 3.

When this bolster is used, of course, the king pin 7 will be retracted to its lower position beneath the plate 1 as shown in Figure 4.

The drawings and description are illustrative merely while the broad principle of the invention will be defined by the appended claims.

What we claim is:

1. A trailer coupling including, a plate having a transverse slot therethrough one end of which is widened, transverse flanges secured to and depending from said plate on opposite sides of the slot, a kingpin whose lower end is approximately square in horizontal cross-section and is fitted through the large end of the slot and whose other end is reduced in diameter, a pin extending through said flanges and through the square end of the kingpin and which pivotally supports the kingpin between said flanges, said kingpin being mounted to move through the slot into inactive position beneath the plate and to move through the slot into vertical, or active, position, a cross pin carried by the lower margins of the flanges on which the kingpin is supported when in inactive position and latch means for latching the kingpin in vertical position.

2. A trailer coupling including, a plate having a transverse slot therethrough, transverse flanges secured to and depending from said plate on opposite sides of the slot, a kingpin whose lower end is approximately square in horizontal cross-section and is fitted through one end of the slot and whose other end is reduced in diameter, a pin extending through said flanges and through the square end of the kingpin and which pivotally supports the kingpin between said flanges, said kingpin being mounted to move through the slot into inactive position beneath the plate and to move through the slot into vertical, or active, position, pin supporting means carried by the lower margins of the flanges on which the kingpin is supported when in inactive position and latch means for latching the kingpin in vertical position.

WILLIAM H. DUVALL.
ALFRED L. BARNARD.

REFERENCES CITED

The following references are of record in the file of this patent:

UNITED STATES PATENTS

| Number | Name | Date |
|---|---|---|
| 1,588,719 | French | Jan. 15, 1926 |
| 1,900,115 | Land et al. | Mar. 7, 1933 |
| 1,976,255 | Connors | Oct. 9, 1934 |
| 1,977,014 | Robb | Oct. 16, 1934 |
| 2,213,424 | Winn | Sept. 3, 1940 |